Feb. 12, 1957 R. C. ALDERSON Re. 24,273
AUTOMATIC STEERING MECHANISM
Original Filed May 7, 1948
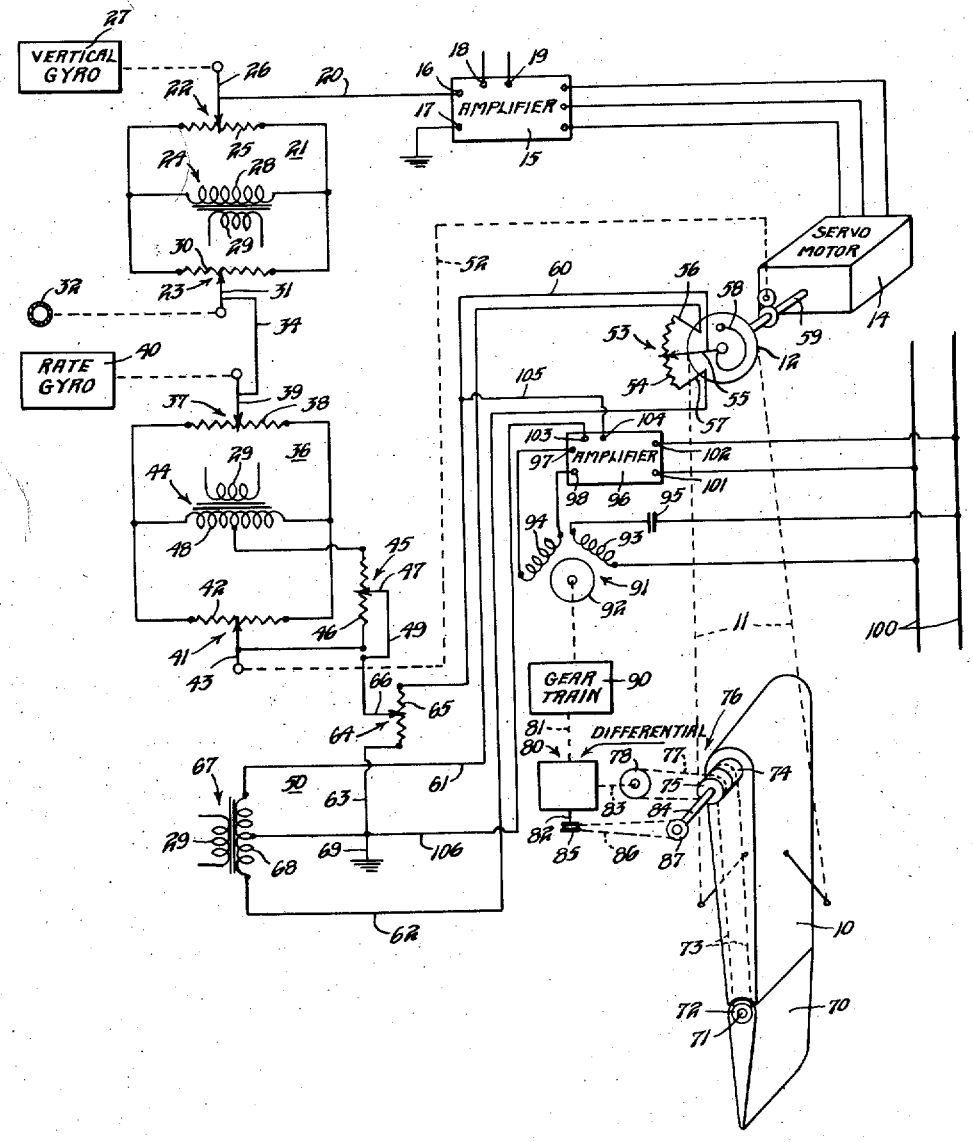
Inventor
ROSS C. ALDERSON
By
George H. Fisher
Attorney United States Patent Office Re. 24,273
Reissued Feb. 12, 1957

24,273

AUTOMATIC STEERING MECHANISM

Ross C. Alderson, St. Louis Park, Minn., assignor to Minneapolis-Honeywell Regulator Company, Minneapolis, Minn., a corporation of Delaware Original No. 2,626,114, dated January 20, 1953, Serial No. 25,555, May 7, 1948. Application for reissue June 7, 1954, Serial No. 435,103

15 Claims. (Cl. 244—77)

Matter enclosed in heavy brackets [ ] appears in the original patent but forms no part of this reissue specification; matter printed in italics indicates the additions made by reissue.

This invention pertains to steering mechanisms for dirigible craft such as automatic pilots for aircraft. This invention is an improvement in the automatic steering mechanism for an aircraft as disclosed in an application of Otto Hugo Schuck and Ross C. Alderson, Serial Number 792,560 filed December 18, 1947.

In the type of steering mechanism exemplified by the aforesaid application, the displacement of the control surface which steers the craft is proportional to the magnitude of the deviation of the aircraft from a desired position. Such steering mechanism is known as a proportional control system. There is undesirable effect present in such a proportional system. In such system the magnitude of control surface displacement is the same regardless of the speed of the craft on which the steering mechanism is mounted. When an aircraft deviates from a desired position, the control surface is displaced to provide a righting moment to the aircraft, the righting moment depending on the magnitude of the deviation and controlled thereby.

In a proportional steering mechanism, as disclosed in the aforesaid application of Schuck and Alderson, the amount of control surface displacement for the same magnitude of deviation from a normal position is approximately the same irrespective of the air speed of the craft. A displaced control surface results in a righting moment being applied to the craft to restore it to its normal position. The righting moment resulting from a displaced control surface is a function of the speed of the craft and also the magnitude of control surface displacement. It is desirable that the righting moment applied to the deviated aircraft be approximately constant over a considerable range in air speed. In order for the righting moment to be approximately constant it is necessary for the control surface to be displaced a smaller amount from its normal position for higher air speeds than for lower air speeds where the magnitude of deviation is the same. A proportional system does not provide for this variation in control surface displacement with air speed for the same deviation.

An object therefore of my invention is to modify the position of a control surface in a proportional automatic steering system in accordance with the force on such displaced control surface.

Another object of my invention is to provide a novel automatic steering apparatus in which the magnitude of displacement of a control surface is affected by the force applied to such control surface.

A further object of my invention is to provide a novel automatic steering apparatus for an aircraft having a balanceable electrical circuit for controlling the actuating means for the control surface with the balance of said control circuit being affected by the force applied to the actuating means.

A further object of my invention is to provide a novel automatic steering apparatus for an aircraft having a balanceable control circuit which controls the operating means for a control surface which balance is affected by the moment applied to such control surface by the medium in which the craft moves and said apparatus includes positioning means for a trim tab associated with the control surface which is positioned in proportion to the moment applied to such control surface.

The above and further objects and novel features of the invention, as well as advantages of its arrangement, will more fully appear from the following detailed description when the same is read in connection with the accompanying drawing.

The drawing consists of a single figure which is a diagrammatic arrangement of my improved steering apparatus for an aircraft.

In the drawing, a main control surface 10, which may be the elevator rudder or an aileron of the aircraft, is operated by cables 11 extending from a cable drum 12. The cable drum 12 is operated through means to be described by a servomotor 14. The servomotor 14 is controlled by an amplifier 15 and is electrically connected thereto for this purpose. The amplifier 15 has terminals 18, 19 which may be connected to the ship's supply or an inverter, not shown, of the aircraft. The terminals 16 and 17 of the amplifier 15 constitute the signal input terminals. The direction of rotation of servomotor 14 depends upon the phase relation between the signal voltage across the terminals 16, 17 and the voltage across terminals 18, 19. The amplifier-servomotor combination, for example, may be of the type disclosed in United States Patent 2,425,734, dated August 19, 1947, in the name of Willis H. Gillie et al. A signal input circuit connected to input terminals 16, 17 of amplifier 15 comprises lead 20, vertical gyro-manual trim variable impedance network 21, lead 34, rate gyro-servo balance variable impedance network 36, lead 49, control surface hinge moment variable impedance network 50, lead 69, to ground and to the grounded terminal 17 of amplifier 15.

The variable impedance network 21 comprises a vertical gyro operated potentiometer 22, a manual trim potentiometer 23, and a transformer 24. The potentiometer 22 consists of a resistor 25 which is connected across the terminals of a secondary winding 28 of transformer 24. The transformer 24 has a primary winding 29 which may be connected to the ship's supply or an inverter, not shown, of the aircraft. A wiper 26 of potentiometer 27 is adjustable over the resistor 25 and is operatively connected to a vertical flight gyro 27.

The vertical gyro 27 is of the type well known in the art having generally a rotor mounted in a casing—for rotation about a vertical spin axis and said casing is supported in a horizontal gimbal ring which in turn is pivotally mounted on a horizontal axis at right angles to the axis of support of the gyro casing in the gimbal ring. The gyro 27 is so positioned in the aircraft that upon movement of the aircraft about its pitch axis the wiper 26 moves with respect to the resistor 25.

The potentiometer 23 includes a resistor 30 which is connected across the terminals of secondary winding 28 in parallel to resistor 25, the potentiometer 23 including a wiper 31 which is operatively connected to a manually adjustable trim knob 32. Lead 20 extends from input terminal 16 of amplifier 15 to the wiper 26 of the vertical gyro potentiometer. It is now evident that the network 21 is in the form of a Wheatstone bridge with the wipers 26 and 31 constituting the output members of the bridge. In normal position, these wipers are at the electrical centers of their respective resistors 25, and 30 so there is no potential difference between the wipers; and the bridge, consequently, has no output with the wipers as thus positioned.

Impedance network 36 consists of a rate gyro operated potentiometer 37, a servomotor operated potentiometer 41, a voltage divider potentiometer 45, and a transformer 44. Potentiometer 37 consists of a resistor 38 which is connected across secondary winding 48 of transformer 44. A wiper 39 of potentiometer 37 is operatively connected to a rate gyro 40.

The rate gyro 40 is of the type well known in the art having a rotor whose spin axis is mounted in a gimbal ring which ring in turn is trunnioned on an axis at right angles to the spin axis. Movement about the axis of the ring is restrained by springs or other suitable means so that the axis of the ring constitutes the axis of precession of the gyro. The magnitude of deflection about the axis of precession is a measure of the rate at which the gyro is turning about an axis perpendicular to the spin axis and the axis of precession.

Potentiometer 41 includes a resistor 42 which is connected across the ends of secondary winding 48 in parallel to resistor 38. A wiper 43 of potentiometer 41 is operatively driven through suitable operating connections 52 by the servomotor 14.

Potentiometer 45 includes a resistor 46 which has one end connected to a center tap of secondary winding 48 and has its other end connected to wiper 43 of potentiometer 41. A slider 47 of potentiometer 45 is manually adjustable over the resistor 46.

The transformer 44 has the same primary winding 29 as transformer 24 since the several secondary windings of the various networks may have a common primary winding. A lead 34 extends from wiper 31 of the manually operable trimmer potentiometer 23 to the wiper 39 of the rate gyro potentiometer 37.

The impedance network 50 comprises an elevator hinge moment potentiometer 53 having resistor 54 and an adjustable wiper 55, a voltage dividing potentiometer having a resistor 65 and an adjustable tap 66, and a transformer 67 having a secondary winding 68 and a primary winding 29.

The resistor 54 is supported in insulated relation from cable drum 12 by the arms 56, 57. A lead 61 extends from one end of resistor 54 to one end of secondary winding 68. A lead 62 extends from the opposite end of resistor 54 to the remaining end of secondary winding 68. A lead 60 extends from wiper 55 to one end of resistor 65 of the voltage dividing potentiometer 64. A lead 63 extends from the remaining end of resistor 65 to a center tap of winding 68. The lead 69 connects the center tap of secondary winding 68 to ground. The lead 49 connects the adjustable tap 47 of potentiometer 45 to the adjustable tap 66 of potentiometer 64.

Wiper 55 of the hinge moment potentiometer 53 is carried by an output shaft 59 of servomotor 14. The cable drum 12 which supports the resistor 54 is driven by the output shaft 59 by means of a resilient transmitting element illustrated by a spiral spring 58. One end of spring 58 is connected to the shaft 59 and the other end of spring 58 is connected by suitable means to the cable drum 12.

When servomotor 14 operates the shaft 59 and cables 11 to position the elevator 10 in the air stream, the air stream in turn applies a resistive moment to the elevator 10. This resistive moment on the elevator 10 is applied through the elevator cables 11 to the drum 12. Due to the presence of the resilient transmission element 58 between the servomotor shaft 59 and the drum 12, the drum may have a relative displacement with respect to shaft 59. The relative displacement of the drum and shaft depends upon the resistive moment applied to the elevator 10. Since the wiper 55 is carried by the shaft and the resistor 54 is carried by the cable drum 12, the wiper 55 and the resistor 54 will also have a relative movement depending upon the resistive moment applied by the air stream to the elevator 10. The relative displacement of wiper 55, with respect to resistor 54, is a measure of the resistive moment applied on the elevator 10 and is also a measure of the effort being developed by the servomotor 14.

An elevator trim tab 70 is mounted on a shaft 71 carried by the elevator 10. A sheave 72 is carried by the shaft 71 and from this sheave extend operating cables 73 which are operated, for example, from an inner sheave 74 of a double pulley 76. The pulley 76 is loosely carried by a shaft 84 which supports the elevator 10 for rotation in a manner well known. An outer sheave 75 of the double pulley 76 receives cables 77 which extend from a single pulley 78. The pulley 78 is driven by an output member 83 of a compensating differential 80.

The compensating differential 80 may be of any well known type having two input arms 81 and 82 and a middle arm 83 which drives the pulley 78. The input arm 82 carries a sheave 85 which is operatively driven through cables 86 and sheave 87 from the shaft 84 which carries the elevator 10. The arm 81 is driven through a reduction gear train 90 from a trim tab motor 91.

The motor 91 may be a capacitor type induction motor having a rotor 92 which coacts with two field windings 93, 94. One end of winding 93 is connected to one side of line 100 and the other end of winding 93 is connected through a capacitor 95 to the other side of line 100. Line 100 may be connected to the ship's supply or an inverter not shown. Winding 94 of motor 91 is connected across the output terminals 97, 98 of an amplifier 96.

Amplifier 96 includes power input terminals 101, 102 which are connected to the line 100 and signal input terminals 103, 104. The direction of rotation of motor 91 depends upon the phase relationship between the voltage across the signal input terminals 103, 104 and the voltage across the winding 93 of motor 91. The amplifier motor arrangement may be similar to that disclosed in a United States patent to Taylor 2,388,350. Signal input terminal 103 is connected by means of lead 106 to the center tap of secondary winding 68. Signal input terminal 104 is connected by means of leads 105, 60 to the wiper 55 of the hinge moment potentiometer 53.

Having described the component parts of my apparatus and the interrelationship of these parts whereby they form an automatic steering mechanism, the operation of the steering mechanism will be considered.

Operation

The operation of the automatic steering mechanism is considered with respect to the departure of the control components of the steering mechanism from a datum. When the aircraft, on which the mechanism is mounted, is at the datum point or point of reckoning, the impedance network 21 is in balanced condition, that is to say, wiper 26 and wiper 31 are at the electrical centers of their respective resistors 25 and 30 with no difference of potential between them. In the impedance network 36 the wiper 39 is at the electrical center of resistor 38 and the wiper 43 is at the electrical center of resistor 42 at which time they have the same potential as the secondary winding 48 of transformer 44. In the impedance network 50 the wiper 55 is at the electrical center of resistor 54 and is at the same potential as the center tap of secondary winding 68. The elevator 10 and the trim tab 70 are in their normal or streamlined positions. Adjustable taps 47, 66 may be moved to approximately the mid position of resistors 45, 65 as shown.

If the aircraft is on the ground but at the attitude assumed by the aircraft at the datum point, and should it be observed that the elevator 10 is not in its normal position, it may be placed in such position by a manual adjustment. To effect this adjustment, the manual trim knob 32 is operated in one or the other directions depending upon the departure of the elevator 10 from its normal position. This operation of the trim knob 32 causes the wiper 31 to be displaced from its normal position to unbalance the network 21; a signal is thus generated or derived between the wiper 31 and wiper 26 which is applied across the input terminals 16 and 17 of amplifier 15. The amplifier 15 causes the operation of servomotor 14 which, through the cables 11 moves the elevator 10 to its normal position. The servomotor 14 through the follow up 52 also adjusts the wiper 43 of the follow up potentiometer 41. The wiper 43 is no longer at the potential of the center tap of secondary winding 48 so that a voltage is applied across the voltage dividing potentiometer resistor 46. The wiper 43 is positioned until the voltage between the upper end of resistor 46 of the voltage dividing potentiometer 45 and the adjustable tap 47 of the potentiometer is equal and opposite to the voltage across the wipers 31 and 26 of network 21. With the input circuit in balanced condition the servomotor 14 no longer operates.

The aircraft may now be assumed to be in flight at its normal attitude. Since the various impedance networks are supplied with alternating voltage, it is assumed under the half cycle under consideration that the right end of secondary windings 28 and 48 are positive with respect to their left ends and that the upper end of secondary winding 68 is positive with respect to the lower end.

Should a transient disturbance be applied to the aircraft to cause the front of the aircraft to tilt downwardly about the pitch axis, the vertical gyro 27 in response to this downward tilt moves the wiper 26 to the right with respect to resistor 25. The rate gyro 40 also responds to the rate of movement of the aircraft about the pitch axis and also moves wiper 39 to the right with respect to the resistor 38. The input circuit to amplifier 15 is thereby unbalanced which operates and causes the servomotor 14 to rotate counterclockwise thereby to raise the elevator 10. The servomotor 14, through its follow up connection 52, positions the wiper 43 toward the right end of resistor 42 to generate a voltage between wiper 43 and the secondary winding of 48 which is applied across the voltage dividing resistor 46. The voltage between the wiper 47 and the upper end of resistor 46 is in opposition to the signal derived from the vertical gyro 27 and the rate gyro 40. As the elevator 10 is being raised the air stream applies a resistive force to the elevator 10 whereby a hinge moment of the elevator about its shaft 84 is developed. This hinge moment on the elevator 10 resists the rotation of servo cable drum 12. Due to the resilient connection 58 between the cable drum 12 and the shaft 59, the shaft driven wiper 55 is displaced with respect to the resistor 54 so that the wiper is moved toward the lower end of resistor 54. The wiper 55 is now negative with respect to the center tap of secondary winding 68. The upper end of voltage dividing resistor 65 is therefore negative with respect to the center tap since it is connected by means of lead 62, wiper 55. The lower end of dividing resistor 65 is positive, therefore, with respect to the upper end. The tap 66 may be adjusted along the resistor 65 to select any desired portion of the voltage between wiper 55 and the center tap of winding 68. The servomotor 14 continues to rotate until the voltage between wiper 47 and the lower end of resistor 46 plus the voltage between tap 66 and the lower end of resistor 65 is equal but opposite to the voltage obtained from the impedance network 21 due to the movement of vertical gyro 27 and the voltage between the rate potentiometer wiper 39 and the center tap of secondary 48.

The disturbance, as stated, was transient or momentary in character. Although the hinge moment potentiometer 53 generated a signal by means of the relative displacement of wiper 55 and resistor 54 which was applied to the amplifier 96 resulting in the operation of trim tab motor 91 yet since the motor 91 operates through a reduction gear train 90 the trim tab 70 is not appreciably positioned during transient disturbances because of the high gear ratio in gearing 90.

The purpose of providing the compensating differential 80 will now be apparent. As stated, the high ratio in gearing 90 during transient conditions results in no appreciable movement of the input member 81 of differential 80. It is evident that if gearing 90 directly operated the double sheave 96 and were the elevator 10 moved toward the raised position as during the operation described that the sheave 76 would be held against rotation while the elevator 10 moved in the upward direction. This would result in a lowering of the trim tab or in a movement of the trim tab 70 toward the left from its position as shown. In order that the trim tab not be moved during this operation of the elevator, a compensating effect is provided by the differential 80 whereby the elevator shaft 84 through the second input member 82 causes a rotation of the output member 83 which compensates for the movement of the elevator and maintains the trim tab 70 in its proper position with respect to the elevator 10.

The restoring moment applied to the aircraft as the result of the upward movement of the elevator 10 causes the aircraft to move toward its normal position or the datum point. The vertical gyro 27 moves its wiper 26 toward the center of resistor 25. Since the aircraft is moving in a direction about the pitch axis opposite to that when it was subject to the transient disturbance, the rate gyro operated wiper 39 is to the left of the electrical center of resistor 38. The input circuit of amplifier 15 is now unbalanced. This unbalance, at this time, produces a signal voltage of opposite character than the initial character of the unbalance signal to amplifier 15. The servomotor 14 therefore rotates in an opposite direction tending to return the elevator 10 toward its normal position. The servomotor 14 rotates and drives the follow up potentiometer 43 toward the left or toward the center of resistor 42. Since the elevator is moved toward its normal position there is less force of the air stream on the elevator 10 and consequently the hinge moment signal derived from potentiometer 53 is being decreased since wiper 55 is being moved by spring 58 toward the center of resistor 54.

When the aircraft regains its original position the vertical gyro operated wiper 26 is again at datum, the rate gyro operated wiper 39 is at datum, and the follow up wiper 43 and the wiper 55 of the hinge moment potentiometer 53 are also at their normal positions. The automatic steering mechanism thus maintains or restores the aircraft to its original attitude following the action of a transient disturbing condition.

It is evident that if the transient condition were such as to cause the raising of the front end of the aircraft that the aircraft by means of the steering mechanism would also regain its original attitude by the application of down elevator rather than an up elevator as in the disturbance described.

It is evident that the voltage dividing potentiometers 45 as associated with the follow up potentiometer 41 and the hinge moment potentiometer 53 with its voltage dividing potentiometer 64 provide an arrangement whereby the elevator 10 is positioned smaller amounts when the hinge moment, due to higher air speeds is larger than when the hinge moment due to smaller air speeds is less. It is further evident that by positioning the adjustable taps 47 and 66 that the operation of the input circuit of amplifier 15 may vary from a pure proportional operation to one depending solely upon the hinge moment being applied to the elevator. For example, with the adjustable tap 66 moved toward the lower end, as shown, of resistor 65 and the adjustable tap 47 moved toward the lower end, as shown, of resistor 146 the input circuit of amplifier 15 is only balanced when the servomotor 14 has positioned wiper 43 with respect to resistor 42 in accordance with any existing unbalancing signal. The actual elevator position, however, is less than the proportional displacement of servomotor shaft 59 due to the resilient driving connection 58 between the shaft 59 and the cable drum 12. The actual balance of the input circuit to amplifier 15, however, is not now affected by the hinge moment or force being applied to the elevator 10 by the air stream.

If the adjustable tap 47 is moved to the upper end, as shown, of resistor 45 in the figure and the adjustable tap 66 is moved toward the upper end, as shown, of resistor 65 in the figure, then the input signal of amplifier 15 is only balanced by the output of the hinge moment potentiometer 53. The output of this potentiometer depends upon the righting movement being applied to the aircraft by the elevator or to the hinge moment being applied to the elevator. The moment on elevator 10 varies with the speed of the aircraft as well as the displacement of the craft from datum. The righting moment provided by the displaced elevator is thus maintained constant as less elevator displacement is incurred for the same departure from datum as the air speed increases. That is to say, the balancing signal provided by the hinge moment potentiometer 53 is the same when the hinge moment is constant and this potentiometer thus controls the servomotor 14 through the network of amplifier 15 to decrease the amount of displacement of elevator 10 as the air speed increases.

With the taps 47 and 66—at the upper end of resistor 45, and 65, as stated, the apparatus will maintain the attitude of the craft as desired despite the presence of a continuous disturbance. The operation of the steering mechanism will thus be considered when a continuous rather than a transient disturbing moment is being applied to the aircraft. This disturbing moment may, for example, be the result of a change in the position of the center of gravity along the longitudinal axis of the aircraft. If the center of gravity moves toward the front of the aircraft, the front of the aircraft will move downwardly about the pitch axis. The vertical gyro and the rate gyro will move their respective wipers toward the right as in the case of the transient disturbance described whereby the input circuit of amplifier 15 is unbalanced causing the operation of servomotor 14 to move the elevator 10 in an upward direction. This movement of the elevator by the servomotor is followed by the movement of the rebalancing potentiometer wiper 43 which now has no effect on the signal circuit and the movement of wiper 55 of the hinge moment potentiometer with respect to resistor 54 which latter potentiometer balances the amplifier input circuit. Under the righting moment of the applied elevator the aircraft moves toward its original position. The wiper 26, controlled by the vertical gyro 27, for purpose of analysis, does not immediately return to its center position on resistor 25 since the mechanism must provide a partial displacment of the elevator to counteract the continuous disturbing moment being applied to the aircraft. In other words, the attitude of the aircraft has altered to provide a sufficient displacement of the elevator 10 to compensate for the continuous disturbing moment being applied to the aircraft.

The wiper 55 of the hinge moment potentiometer 53 is displaced toward the lower end of resistor 54 as shown, due to the compensating position of the elevator 10. This continuous displacement of wiper 55 with respect to resistor 54 causes a signal to be applied to the amplifier 96 which causes the trim tab motor 91 to operate through the gearing 90 and differential 80, sheave 78, double pulley 76, and cable 73 to position the trim tab 70 in a downward direction. The positioning of the trim tab 70 downwardly results in an upward moment being applied to it from the air stream, which moment tends to oppose the downward moment being applied to the elevator 10 by the air stream. The force on the main elevator cables 11 thereby decreases and the resilient connection 58, moves the resistor 54 counterclockwise toward its normal position with respect to wiper 55. The hinge moment potentiometer 53 therefore generates a smaller signal which results in the unbalancing of the input circuit to amplifier 15. The amplifier 15 causes the servomotor 14 to rotate further in a counterclockwise direction thereby moving the elevator 10 to a greater upward angular displacement.

The operation of the mechanism is continuous. The increased angular displacement of the elevator 10 results in a balancing signal being provided by the hinge moment potentiometer 53 to the input circuit of amplifier 15. This signal from the potentiometer 53 also in turn causes further operation of the slowly moving operating means for the trim tab 70 which decreases the hinge moment potentiometer signal. The further positioning of the elevator 10 results in restoring the aircraft to its normal attitude. At this time the wiper 26 is at the electrical center of resistor 25 and the wiper 55 of the hinge moment potentiometer 53 is at the electrical center of resistor 54. The moment being applied to the elevator 10 is counterbalanced by the moment in an opposite direction derived from the trim tab 70. The normal attitude is maintained by the craft despite the continuous disturbing moment.

It is now evident that I have provided an automatic steering mechanism for an aircraft which includes novel means for governing the extent of control surface displacement in accordance with the reactive force or reactive moment of the air stream on such displaced control surface so that the control surface displacement is modified with air speed. In this novel steering mechanism, I have also provided for the automatic trim of an aircraft by associating with the means responsive to the reactive moment of the air stream on a displaced control surface an automatic trim tab positioning device for positioning the trim tab to compensate for the reactive moment on the control surface.

Although but one embodiment of the invention has been illustrated and described, various changes and modifications in the form and relative arrangement of the components of the embodiment, which will now appear to those skilled in the art, may be made without departing from the scope of the invention. Reference may be made to the appended claims for a definition of the limits of the invention.

I claim as my invention:

1. Control apparatus for an aircraft having a control surface, said apparatus comprising: a vertical gyro; means for generating a first signal upon tilt of said gyro about one axis; control surface power means; follow-up means operated by said power means for generating a second signal; means responsive to the force developed by said power means in positioning said control surface for generating a third signal; means for combining said signals; and means controlled by said combining means for operating said power means.

2. Control apparatus for an aircraft having a control surface, said apparatus comprising: means responsive to a condition for deriving a first signal proportional to the magnitude of said condition; control surface power means for deriving a second signal proportional to the magnitude of movement of said power means; means for selecting a portion of said second signal; means for deriving a third signal proportional to the reactive force of said control surface on said power means; and combining means controlled by the first, third and the selected portion of said second signal and adapted to control said power means whereby selecting various portions of said second signal modifies the extent of control surface movement.

3. Control apparatus for an aircraft having a control surface provided with a trim tab comprising: attitude responsive means; means for deriving a signal in proportion to the magnitude of movement of the attitude means about an axis; control surface power means; means for deriving a signal proportional to the reactive force between said control surface and said power means; means for combining said attitude signal and said power means signal and operatively controlling said power means; trim tab power means; operating means for said trim tab power means; and means for connecting said operating means to said power means signal deriving means, whereby positioning of said trim tab removes said reactive force and permits said attitude means to restore the craft to original position.

4. Control apparatus for an aircraft having a control surface provided with a trim tab, said apparatus comprising: control surface power means; trim tab motor means; craft position responsive means; control means for said power means and operated by said responsive means; follow-up means driven by said power means, means responsive to the effort developed by said power means, said follow-up and said effort responsive means operating said control means in opposition to said craft position means; and means for controlling said trim tab motor means and also operated by said effort responsive means.

5. Control apparatus for an aircraft having a control surface, said apparatus comprising: position responsive means; control surface power means; control means for said power means; means for generating an electrical signal in proportion to the movement of said responsive means from a predetermined position and operating said control means; means responsive to the effort developed by said power means for generating an electrical signal for said control means in opposition to said signal from said position responsive means; and automatic trim means also responsive to said effort signal for removing the load on the power means and thereby reducing said effort signal to thereby cause further operation of said control means from said position responsive signal means.

6. Control apparatus for an aircraft having a control surface, said apparatus comprising: position responsive means; power means; control surface operating means driven by said power means; control means for operating said power means; means operated by said responsive means for generating a signal to effect operation of said control means; means responsive to the effort applied to said operating means for generating a signal for said control means in opposition to said position responsive means signal; a trim tab power means having a slow response; and means for controlling said trim tab power means from the operating means signal generating means to reduce the magnitude of said signal from said operating means.

7. Control apparatus for an aircraft having a control surface, said apparatus comprising: a power means; means on said aircraft for deriving a first signal in proportion to change of position of said aircraft to effect operation of said power means; means for operating said control surface and driven by said power means; means actuated by said operating means to derive a second signal in proportion to the effort applied to said operating means to opposite said first signal; and means also responsive to said second signal for reducing the effort applied to said operating means to thereby modify said second signal.

8. Control apparatus for an aircraft having motor means for changing the attitude of said craft, said apparatus comprising: control means for reversibly operating said motor means; a balanceable network connected to said control means and causing operation thereof upon unbalance of said network, said network including three signal generators for affecting said balance; means for operating one of said generators to effect operation of said motor means; follow-up means driven by said motor means in proportion to its extent of movement for operating a second signal generator; and means operated in proportion to the force opposing said motor means for adjusting a third signal generator, whereby when no opposing force is applied to said motor said network is rebalanced by said follow-up means.

9. Control apparatus for an aircraft having motor means for operating a control surface for changing the attitude of said craft, said apparatus comprising: control means for reversibly operating said motor means; a balanceable network connected to said control means and causing operation thereof upon unbalance of said network, said network including a plurality of signal generators for affecting said balance; means for operating one generator to effect operation of said motor means; follow-up means driven by said motor means in proportion to its extent of movement for operating a second signal generator; and means operated in proportion to the force opposing said motor means for adjusting a third signal generator, means for varying the signal from said third generator applied to said network whereby movement of said control surface proportional to the operation of said first signal generator is obtained.

10. Control apparatus for an aircraft having motor operated means for changing the position of said craft about an axis, said apparatus comprising: control means for reversibly operating said motor; a first signal means for initiating operation of said control means; a second signal means operated in proportion to the extent of movement of said motor; a third signal means operated in proportion to the force opposing operation of said motor; signal combining means connected to said signal means and electrically connected to said control means; and means for opposing the effect of said first signal on said control means by either said second or said third signals.

*11. A follow-up control for automatic pilots having a servomotor, comprising primary signal means for operating said motor, means for producing a second signal in accordance with a function of the torque output of said motor, means for producing a third signal in accordance with a function of the displacement of said motor from normal, means for combining said second and third signals, and means for feeding said combination as an input to said motor in opposition to said primary signal.*

*12. A follow-up control for automatic pilots having a motor, comprising signal means for operating said motor, means for producing a signal in accordance with the torque output of said motor, means for producing a signal in accordance with the displacement of said motor from normal, and means for feeding said latter two signals to said motor in opposition to the signal of said operating means.*

*13. In a control system wherein a controlled member is positioned by a servomotor in response to an error signal, a feed-back loop for the servomotor including means generating a countersignal proportional to torque exerted on the controlled member, and means generating a further countersignal proportional to the displacement of the controlled member as it is moved by said servomotor under the influence of the aforesaid combined signals.*

*14. In a control system for a craft having a controlled member positioned by a servomotor in response to an error signal that is proportional to a departure of the craft from a predetermined attitude, a feed-back loop for the servomotor including means generating a signal proportional to the torque exerted on the controlled member, and means generating a signal proportional to the displacement of the controlled member, said torque signal and said displacement signal being connected to oppose said error signal, whereby said error signal is effectively eliminated as the craft reaches the described attitude.*

*15. In a control system for a craft having a directional reference means and means for generating a primary control signal in accordance with departure of a craft from the direction established by said directional reference means, a servomotor connected to position a craft control surface member in response to said primary signal, means generating a signal proportional to the displacement of the controlled member, means generating a signal proportional to the torque of the controlled member, said last two signals being connected to wipe out said primary*

*signal as the craft approaches the direction established by said directional reference means.*

References Cited in the file of this patent or the original patent

UNITED STATES PATENTS 2,183,932 Carlson ---------- Dec. 19, 1939
2,232,982 Tank ---------- Feb. 25, 1941
2,451,263 Webb ---------- Oct. 12, 1948
2,475,484 De Nise ---------- July 5, 1949
2,511,846 Halpert ---------- June 20, 1950
2,568,719 Curry, Jr. ---------- Sept. 25, 1951